United States Patent
Lee et al.

(10) Patent No.: US 8,382,455 B2
(45) Date of Patent: Feb. 26, 2013

(54) STATOR FOR LINEAR COMPRESSOR

(75) Inventors: Jong-Koo Lee, Changwon-si (KR);
Sangmin Lee, Gimhae-si (KR);
Seong-Yeol Hyeon, Gimhae-si (KR)

(73) Assignee: LG Electronics Inc., Seoul (KR)

(*) Notice: Subject to any disclaimer, the term of this patent is extended or adjusted under 35 U.S.C. 154(b) by 232 days.

(21) Appl. No.: 12/739,082

(22) PCT Filed: Oct. 9, 2008

(86) PCT No.: PCT/KR2008/005949
§ 371 (c)(1),
(2), (4) Date: Aug. 23, 2010

(87) PCT Pub. No.: WO2009/054628
PCT Pub. Date: Apr. 30, 2009

(65) Prior Publication Data
US 2010/0310393 A1  Dec. 9, 2010

(30) Foreign Application Priority Data
Oct. 24, 2007  (KR) .................. 10-2007-0107385

(51) Int. Cl.
*F04B 35/04* (2006.01)
*F04B 17/04* (2006.01)
*H02K 41/00* (2006.01)
*H02K 41/02* (2006.01)

(52) U.S. Cl. .................. 417/417; 310/12.24; 310/14

(58) Field of Classification Search .................. 417/417; 310/12.21, 12.24, 13–15, 23, 30, 34
See application file for complete search history.

(56) References Cited

U.S. PATENT DOCUMENTS

| | | | | |
|---|---|---|---|---|
| 6,888,271 B2 * | 5/2005 | York | ......................... | 310/49.32 |
| 6,956,306 B2 * | 10/2005 | Yumita et al. | .............. | 310/12.01 |
| 7,256,519 B2 * | 8/2007 | Ito et al. | ..................... | 310/12.27 |
| 7,323,800 B2 * | 1/2008 | Lee et al. | ............... | 310/216.074 |
| 7,385,319 B2 * | 6/2008 | Hong | ............................ | 310/15 |
| 7,397,161 B2 * | 7/2008 | Kim | ....................... | 310/216.023 |
| 7,449,804 B2 * | 11/2008 | Yoon et al. | ..................... | 310/15 |
| 7,459,810 B2 * | 12/2008 | Jeong et al. | ..................... | 310/15 |
| 7,633,187 B2 * | 12/2009 | Kim et al. | .................. | 310/12.22 |
| 2004/0245863 A1 | 12/2004 | Hong et al. | | |
| 2006/0250031 A1 | 11/2006 | Kim | | |

FOREIGN PATENT DOCUMENTS

| | | |
|---|---|---|
| KR | 10-2004-0091486 | 10/2004 |
| KR | 10-2004-0105080 | 12/2004 |
| WO | WO 2004/082101 | 9/2004 |

OTHER PUBLICATIONS

International Search Report issued in PCT/KR2008/005949 dated Apr. 16, 2010.

* cited by examiner

*Primary Examiner* — Peter J Bertheaud
(74) *Attorney, Agent, or Firm* — KED & Associates LLP

(57) ABSTRACT

A stator for a linear compressor is provided that includes a coil winding, in which a coil is wound in a circumferential direction and current flows; a bobbin set, which is wound with the coil winding and which insulates the coil winding; and a plurality of core blocks, which is arranged in a circumferential direction of the bobbin set at predetermined intervals from an axial direction of the bobbin set, and which is advantageously used to simplify the manufacturing process, enhance the clamping force, reduce an overall production cost, and reduce a size of a product incorporating the same.

18 Claims, 4 Drawing Sheets

STATOR FOR LINEAR COMPRESSOR

TECHNICAL FIELD

The present invention relates in general to a stator for a linear compressor, and more particularly, to a stator for a linear compressor, which contributes to a simplified manufacture process and an enhanced bonding force between components that are assembled together.

BACKGROUND ART

In general, a reciprocating compressor is designed to form a compression space to/from which an operation gas is sucked/discharged between a piston and a cylinder, and the piston linearly reciprocates inside the cylinder to compress refrigerants.

Most reciprocating compressors today have a component like a crankshaft to convert a rotation force of a drive motor into a linear reciprocating drive force for the piston, but a problem arises in a great mechanical loss by such motion conversion. To solve the problem, development of linear compressors is still under progress.

Linear compressors have a piston that is connected directly to a linearly reciprocating linear motor, so there is no mechanical loss by the motion conversion, thereby not only enhancing compression efficiency but also simplifying the overall structure. Moreover, since their operation is controlled by controlling an input power to a linear motor, they are much less noisy as compared to other compressors, which is why linear compressors are widely used in indoor home appliances such as a refrigerator.

FIG. 1 illustrates one example of a linear compressor in accordance with a prior art.

The conventional linear compressor has an elastically supported structure inside a shell (not shown), the structure including a frame 1, a cylinder 2, a piston 3, a suction valve 4, a discharge valve assembly 5, a motor cover 6, a supporter 7, a back cover 8, mainsprings S1 and S2, a muffler assembly 9, and a linear motor 10.

The cylinder 2 is insertedly fixed to the frame 1, and the discharge assembly 5 constituted by a discharge valve 5a, a discharge cap 5b, and a discharge valve spring 5c is installed to cover one end of the cylinder 2. The piston 3 is inserted into the cylinder 2, and the suction valve 4 which is very thin is installed to open or close a suction port 3a of the piston 2.

The motor cover 6 supports an outer stator 12 of the linear motor 10 in an axial direction to fix the outer stator 12 and is bolted to the frame 1 at the same time. The back cover 8 is coupled to the motor cover 6, and between the motor cover 6 and the back cover 8 there is the supporter 7 that is connected to the other end of the piston 3, while being elastically supported in an axial direction by the mainsprings S1 and S2. The muffler assembly 9 for sucking in refrigerant is also fastened to the supporter 7.

Here, the mainsprings S1 and S2 consist of four front springs S1 and four rear springs S2 that are arranged horizontally and vertically symmetrical about the supporter 7. As the linear motor 10 starts running, the front springs S1 and the rear springs S2 move in opposite directions and buff the piston 3 and the supporter 7. In addition to these springs, the refrigerant in the compression space P functions as sort of a gas spring to buff the piston 3 and the supporter 7.

The linear motor 10 includes an inner stator 11, an outer stator 12, a permanent magnet 13, and a connecting member 14, and is installed in such a way that the permanent magnet 13 is able to linearly reciprocate while maintaining an air-gap between the inner stator 11 and the outer stator 12. The permanent magnet 13 is operationally connected to the piston 3 with a connecting member 14. Because of that, when the permanent magnet 13 makes a linear reciprocating motion by an interactive electromagnetic force between itself and the inner and outer stators 11 and 12, it causes the piston 3 to move as well.

Therefore, when the linear motor 10 starts running, the piston 3 and the muffler assembly 9 connected to the piston 3 linearly reciprocate together, and with variations in pressure of the compression space P the operation of the suction valve 4 and the discharge valve assembly 5 are automatically regulated. Through this operation mechanism, refrigerant is sucked into the compression space P after travelling through the suction pipe on the side of the shell, the opening in the back cover 9, the muffler assembly 10, and the suction ports 3a in the piston, is compressed, and then escapes to the outside via the discharge cap 5b, a loop pipe L, and an outflow pipe on the side of the shell.

FIG. 2 illustrates one example of an outer stator in a linear compressor in accordance with a prior art. The conventional outer stator 12 is constituted by a coil 12a wound around a bobbin (not shown) in a circumference direction to enable the current flow, a plurality of core blocks 12b arranged in a circumference direction at predetermined intervals, and injection-molded bodies 12c for securing the core blocks 12b to the coil 12a.

To obtain the outer stator, one winds the coil 12a around the bobbin, tentatively arranges the core blocks 12b in the circumference direction of the coil 12a at predetermined intervals using the a jig (not shown), and secures the core blocks 12b at the coil 12a through insert injection. At this time, insulation between the coil 12a and the core blocks 12b should be performed in order to prevent the current flow between them. This is achieved by filling a space between the coil 12a and the core blocks 12b with the injection-molded bodies 12c, or by making sure that the core 12a and the core blocks 12b are spaced apart from each other by a certain distance.

In the former case, however, where insulation between the coil and the core blocks is performed with use of the injection-molded bodies, it is difficult to check whether the space is filled with the injection-molded bodies in a satisfactory manner, and this difficulty is often led to deterioration in the performance reliability, increase in production cost, and possible deformation after the injection-molded bodies are hardened, thereby requiring a post-process to ensure an air-gap between the inner stator, the outer stator, and the permanent magnet later, not being advantageous in terms of mass productivity.

On the other hand, in the case that the coil and the core blocks are spaced apart from each other by a certain distance for insulation, an overall size of the linear motor increases and further the linear compressor using such a motor increases in size also.

DISCLOSURE OF INVENTION

Technical Problem

The present invention is conceived to solve the aforementioned problems in the prior art. An object of the present invention is to provide a stator for a linear compressor, a coil and core blocks of which are effectively insulated and are assembled with easiness.

Another object of the present invention is to provide a stator for a linear compressor, a coil and core blocks of which are effectively insulated and an overall size of which is reduced.

Technical Solution

According to an aspect of the present invention, there is provided a stator for a linear compressor, comprising: a coil winding, in which a coil winds in a circumference direction and current flows; a bobbin set, which is wound with the coil winding and which insulates the coil winding; and a plurality of core blocks, which are arranged in a circumference direction of the bobbin set at predetermined intervals from an axial direction of the bobbin set.

In one embodiment of the present invention, the bobbin set is a pair of injection-molded bodies, which come in contact with inner and outer diameters of the coil winding, respectively, and which are assembled to each other with the coil winding being built in.

In one embodiment of the present invention, the bobbin set includes positioning units which are formed in the circumference direction at predetermined intervals to have core blocks settled thereon.

In one embodiment of the present invention, the positioning units are assembly guides, which are protruded over both axial ends and/or from the outer contour face of the bobbin set and which come in contact with both ends of the core blocks in the circumference direction.

In one embodiment of the present invention, the stator comprises a dislocation preventing means, which is provided between the bobbin set and the core blocks, so as to prevent the core blocks from being dislocated from the bobbin set in the axial direction.

In one embodiment of the present invention, the dislocation preventing means includes a safety bar provided to an inside on axial both ends of the bobbin set, and a hook formed at an inner counter face of one end of each core block.

In one embodiment of the present invention, the stator comprises a fixation means, which is provided between the bobbin set and the core blocks, so as to fix the core blocks to the bobbin set.

In one embodiment of the present invention, the fixation means includes a fixing groove elongatedly formed on both axial ends of the bobbin set in the circumference direction, and a fixing wedge formed on the inner counter face of the core blocks to slide into the fixing groove.

Advantageous Effects

In the stator for a linear compressor in accordance with the present invention, the bobbin set is assembled to be wound with the coil and the core blocks are arranged in the circumference direction of the bobbin set, such that the coil and the core blocks are insulated from each other and the core blocks can be assembled at the coil. Consequently, the performance reliability is increased, the production cost is cut, and the assembly deformation of components can be prevented, without requiring an additional post-process to correct the deformation. Overall, the productivity can be increased.

In the stator for a linear compressor in accordance with the present invention, the bobbin set which is used as a sort of injection-molded bodies is seated between the coil and the core blocks, such that the coil and the coil blocks are insulated and a spacing between the core blocks can be decreased. Consequently, the total size of a linear motor can be reduced, and further the total size of a linear compressor can be reduced also.

In the stator for a linear compressor in accordance with the present invention, the assembly guides are provided at predetermined intervals in the circumference direction of the bobbin set which is manufactured in form of injection-molded bodies, such that the core blocks can be assembled in accurate positions of the bobbin set, thereby enhancing the assemblability and preventing the dislocation of the core blocks. Besides, the presence of the dislocation preventing means and the fixation means at the engaged portion between the bobbin set and the core blocks helps the core blocks more stably fixed, simplifies the assembly process, and increase the productivity.

MODE FOR THE INVENTION

Hereinafter, preferred embodiments of the present invention will be described in detail with reference to the accompanying drawings.

Figure 1:
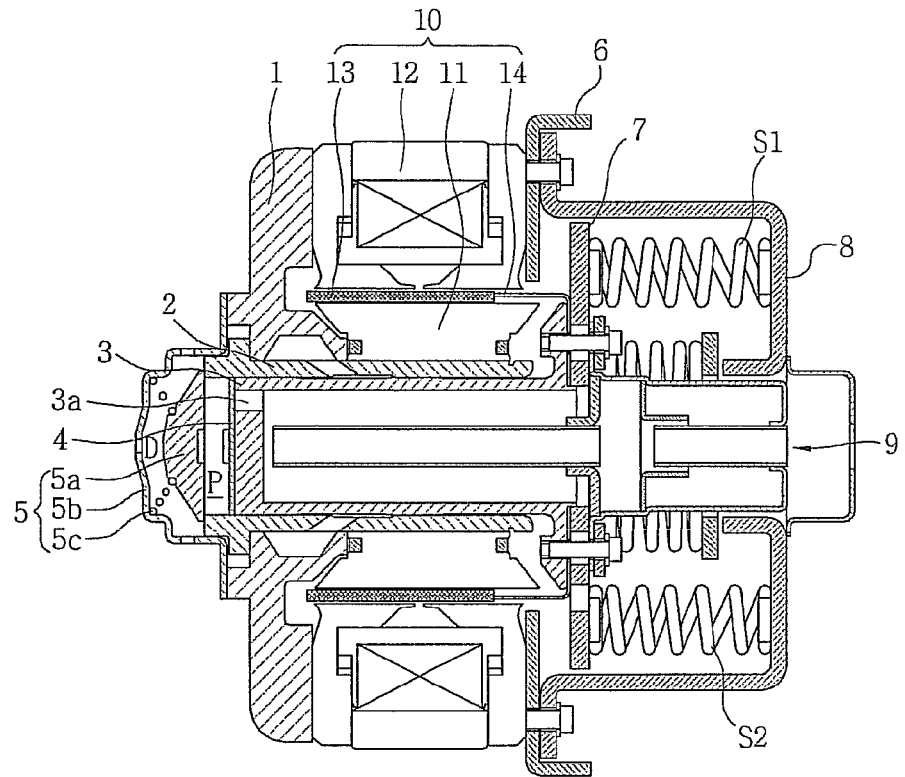
FIG. 1 illustrates one example of a linear compressor in accordance with a prior art.
Figure 2:
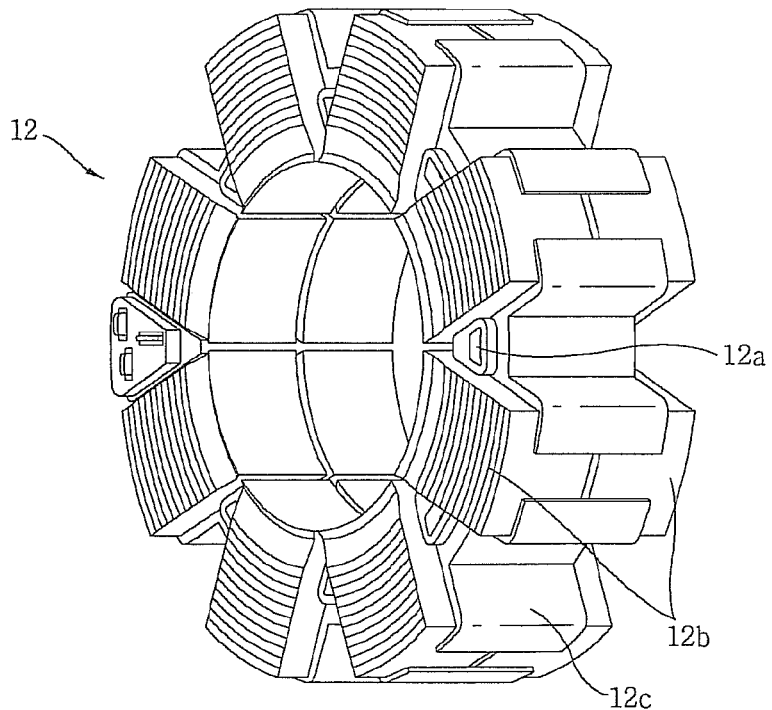
FIG. 2 illustrates one example of an outer stator for a linear compressor in accordance with a prior art.
Figure 3:
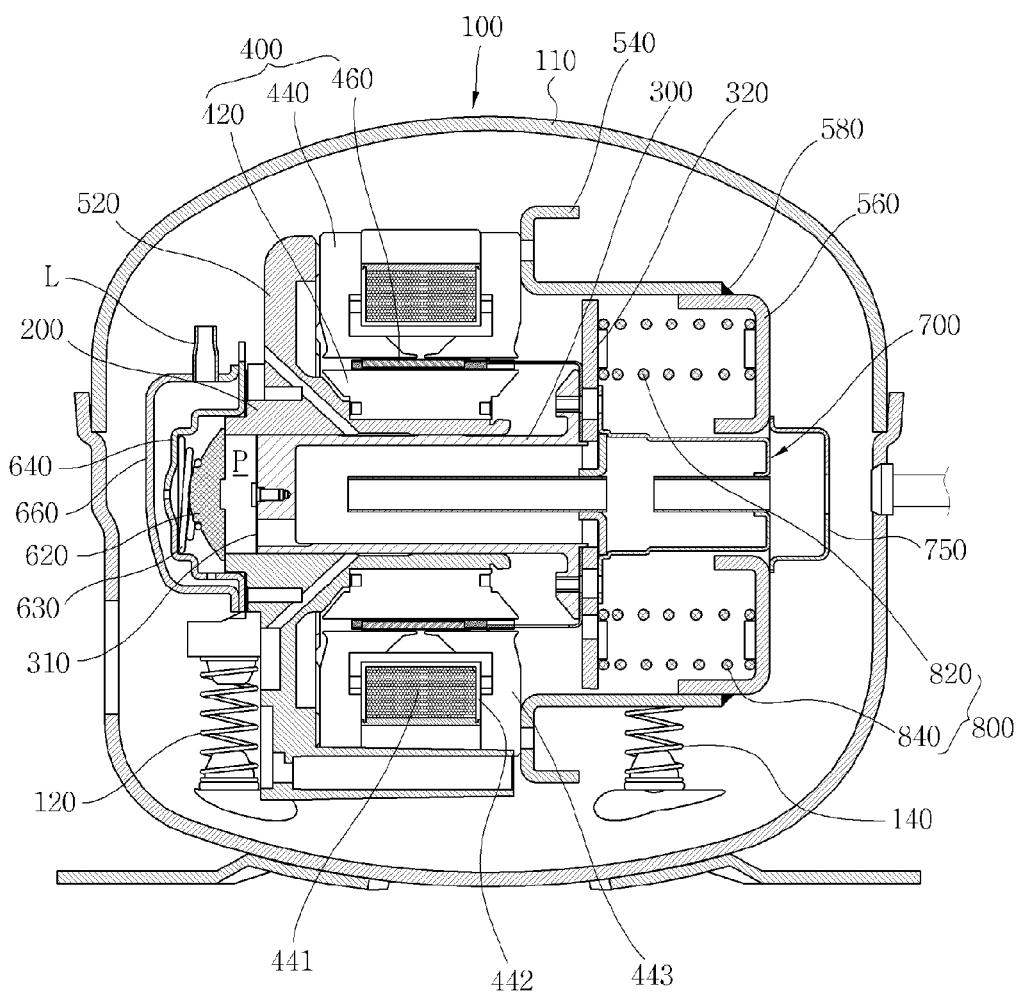
FIG. 3 illustrates one example of a linear compressor in accordance with the present invention.

FIG. 3 illustrates one example of a linear compressor in accordance with the present invention. In one example, a linear compressor 100 of the present invention includes, in a shell 110 used as a hermetic container, a cylinder 200, a piston 300, and a linear motor 400 having an inner stator 420, an outer stator 440, and a permanent magnet 460. When the permanent magnet 460 starts a linear reciprocating motion by an interactive electromagnetic force between the inner stator 420 and the outer stator 440, the piston 300 operationally coupled to the permanent magnet 460 also linearly reciprocates.

The inner stator 420 is affixed to an outer contour of the cylinder 200, and the outer stator 440 is secured axially by a frame 520 and a motor cover 540. The frame 520 and the motor cover 540 are joined together by fastening members such as bolts, and the outer stator 440 is secured between the frame 520 and the motor cover 540. The frame 520 may be integrately formed with the cylinder 200, or the frame 520 may be manufactured separately and then coupled to the cylinder 200 later. The embodiment in FIG. 3 shows an example where the frame 520 and the cylinder 200 are integrated as one body.

The supporter 320 is connected to the rear side of the piston 300. Four front mainsprings 820 are supported on both ends by the supporter 320 and the motor cover 540. Also, four rear mainsprings 840 are supported on both ends by the supporter 320 and a back cover 560, and the back cover 560 is coupled to the rear side of the motor cover 540. A suction muffler 700 is provided on the rear side of the piston 300, through which refrigerant flows into the piston 300, so less noise is generated during suction feeding.

The interior of the piston 300 is hollowed to allow the refrigerant which is fed through the suction muffler 700 to be introduced and compressed in a compression space P defined between the cylinder 200 and the piston 300. A suction valve 610 is seated at the front end of the piston 300. The suction valve 610 in the open position allows the refrigerant to flow from the piston 300 into the compression space P, and it shuts the front end of the piston 300 to prevent backflow of the refrigerant from the compression space P to the piston 300.

When refrigerant inside the compression space P is compressed to a predetermined level or higher, it causes a discharge valve 620 which is seated at the front end of the cylinder 200 to open. The discharge valve 620 is elastically supported by a spiral discharge valve spring 630 inside a support cap 640 that is secured to one end of the cylinder 200. The high-pressure compressed refrigerant is then discharged into a discharge cap 660 via a hole which is formed in the support cap 640, and then escapes from the linear compressor 100 via a loop pipe L to be circulated, thereby making the refrigeration cycle work.

Each component of the linear compressor 100 discussed before are supported, in assembled state, by a front support spring 120 and a rear support spring 140, and they are spaced apart from the bottom of the shell 110. Because they are not in direct contact with the bottom of the shell 110, vibrations produced from each component of the compressor 100 during the compression of refrigerant are not transferred directly to the shell 110. Therefore, it becomes possible to reduce vibrations being transferred to the outside of the shell 110 and noise produced by vibrations of the shell 110.

Figure 4:
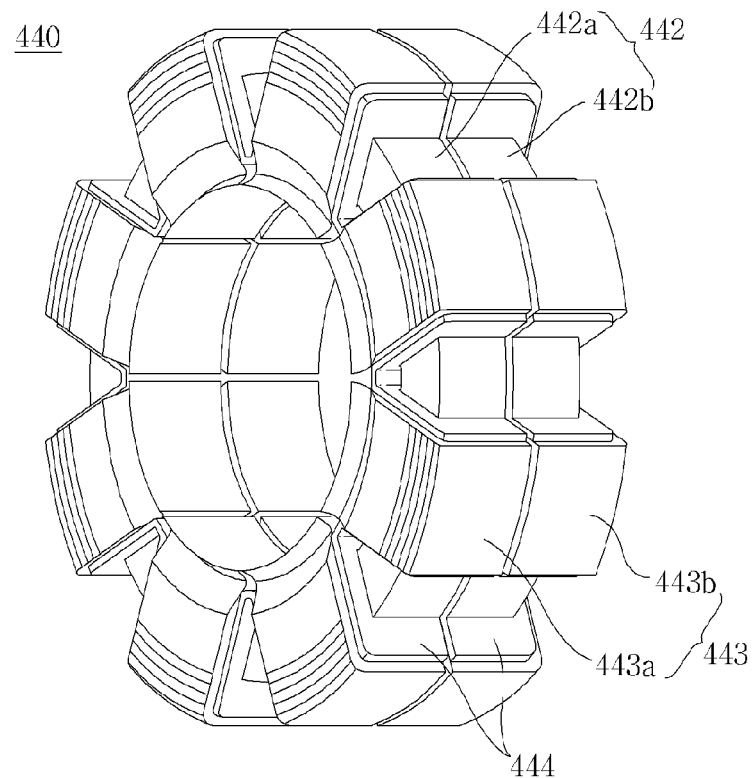
FIG. 4 illustrates one example of an outer stator for a linear compressor in accordance with the present invention.
Figure 5:
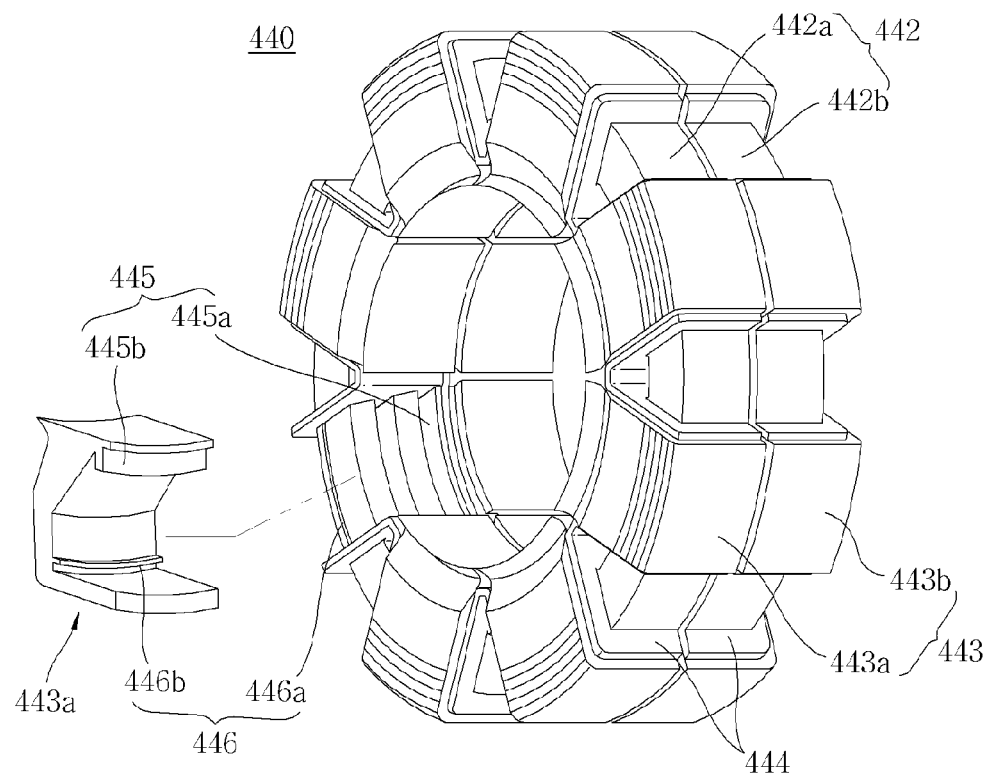
FIG. 5 illustrates a partial exploded view of an outer stator for a linear compressor in accordance with the present invention.
Figure 6:
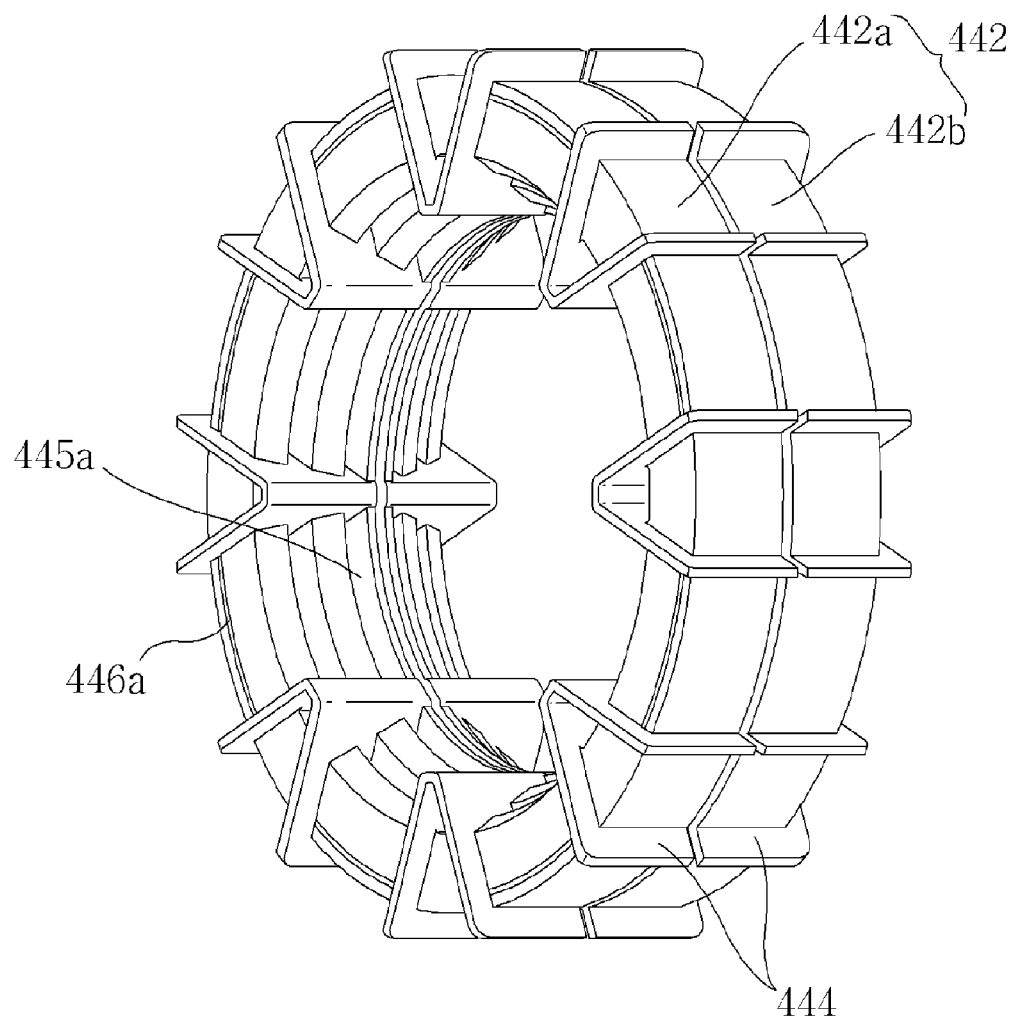
FIG. 6 illustrates one example of a bobbin adapted to a linear compressor in accordance with the present invention.

FIG. 4 and FIG. 5 each illustrate one example of an outer stator for a linear compressor in accordance with the present invention and FIG. 6 illustrates one example of a bobbin adapted to a linear compressor in accordance with the present invention. An inner stator 420 (see FIG. 3) includes a plurality of laminations in form of a cylinder along the circumference direction, and an outer stator 440 including a coil 441 (see FIG. 3), a bobbin set 442, and core blocks 443 also takes the form of a cylinder that is installed outside the inner stator 420 (see FIG. 3) with a distance therebetween. Though, the stator mentioned in the present invention is limited to the outer stator 440 which is constituted by the coil 441 (see FIG. 3), the bobbin set 442, and the core blocks 443.

To elaborate the structure of the outer stator 440, the bobbin set 442 which is an injection-molded body in form of a hollow ring is wound with the coil 441 (see FIG. 3) to let an externally applied current flow, and plural core blocks 443 are arranged in the circumference direction of the bobbin set 442 at predetermined intervals. Here, the core blocks 443 are assembled directly to the bobbin set 442.

The bobbin set 442 is assembled in a way to close inner/outer contour faces and front and rear ends of the wound coil 441 (see FIG. 3). It is constituted by first and second injection-molded bodies 442a and 442b engaged in an axial direction, and preferably has a hole (not shown) through which the tip of the coil 441 (see FIG. 3) is withdrawn. Contact portions between the first and second injection-molded bodies 442a and 442b may be bonded, or a thing with a corresponding shape to each of the contact portions between the first and second injection-molded bodies 442a and 442b may be engagedly assembled. That is to say, the wound coil 441 (see FIG. 3) is first settled at the first and second injection-molded bodies 442a and 442b through a mutually open (communicating) portion of the first and second injection-molded bodies 442a and 442b, and then the first and second injection-molded bodies 442a and 442b are assembled. In this way, the coil 441 (see FIG. 3) is built in the bobbin set 442.

The core blocks 443 each have open, a squared-off U-shaped laminations that are stacked at some sections in the circumference direction. In detail, a total of eight pairs of core blocks 443a and 443b are arranged in the circumference direction at predetermined intervals, each pair being engagedly installed with the bobbin set 442 in the axial direction. Needless to say, the core blocks 443 are assembled on the outside of the bobbin set 442 to be insulated from the coil 441 (see FIG. 3).

To facilitate the assembly/fixation of the core blocks 443 to the bobbin set 442, a sort of positioning unit composed of an assembly guide 444, a dislocation preventing means 445, and a fixation means 446 is provided.

The assembly guide 444 marks an assembly position for each of the core blocks 443, so one can easily install the core blocks 443 at accurate positions in the circumference direction of the bobbin set 442 with a predetermined interval between the core blocks. At this time, each of the assembly guides 444, being arranged at predetermined intervals in the circumference direction, looks like a protruding partition wall formed on the outer contour face and the front and rear ends of the bobbin set 442, and comes in contact with both sides of the core blocks 443 in the circumference direction. As such, both sides of the core blocks 443 in the circumference direction make a close contact with the assembly guide 444. It is also acceptable to form the assembly guide 444 only on the outer contour or only on the front and rear ends of the bobbin set 442 to mark the assembly positions of the core blocks 443 at the bobbin set 442, but by consecutively forming the assembly guides 444 on the outer contour and the front and rear ends of the bobbin set 442, a contact area between the core blocks 443 and the assembly guide 444 increases. Consequently, the assembly guide 444 enhances locking force between the bobbin set 442 and the core blocks 443, and prevents the core blocks 443 from being dislocated in the circumferential direction or prevents separation of the laminations from the core blocks 443. Moreover, the assembly guide 444 is also protrusively formed on the inner contour face of the bobbin set 442, thereby insulating the inner contour ends of the core blocks 443 from each other.

The dislocation preventing means 445 is seated between the bobbin set 442 and the core blocks 443 to prevent the core blocks 443 from being dislocated from the axial direction of the bobbin set 442, and it is constituted by safety bars 445a that are stepwisely formed along the inner contour face of the bobbin set 442, and a hook 445b formed on one inner contour face of the core blocks 443 to be engaged with each of the safety bars 445a. Here, the safety bars 445a may be in groove form provided to the inner contour face of the bobbin set 442, or may have a stepwise structure to facilitate the assembly of the hook 445b to the safety bar 445a. As each pair of core blocks 443a and 443b is assembled at predetermined intervals in the circumference direction from the axial direction of the bobbin set 442, the safety bars are also arranged in pair between the assembly guides 444 on the inner contour face of the bobbin set in the circumference direction at predetermined intervals. Of course, the dislocation preventing means 445 may be configured in diverse forms other than the safety bar 445a and the hook 445a at the contact area between the bobbin set 442 and the core blocks 443.

The fixation means 446 is seated between the bobbin set 442 and the core blocks 443, and it is constituted by a fixing groove 446a elongatedly formed on the front and rear ends of the bobbin set 442 in the circumference direction, and a fixing wedge 446b formed on the inner counter face of the core blocks 443 to slide into the fixing groove 446a. In detail, the fixing groove 446a is elongatedly formed between the assembly guides 444 in the circumference direction, and the fixing wedge 446b is also formed in an enlongated protrusion in the circumference direction, being sharper towards the end. Here, the fixing wedge 446b is larger than the fixing groove 446a to get wedged into the fixing groove 446a.

Referring to FIGS. 3 through 5, the following will now explain an example of how the outer stator 440 with the above configuration is assembled.

The wound coil 441 is inserted between the first and second injection-molded bodies 442a and 442b, and then the first and second injection-molded bodies 442a and 442b are assembled to each other to configure the bobbin set 442. Each pair 443a and 443b of the core blocks 443 is arranged in the circumference direction at predetermined intervals from the axial direction of the bobbin set 442. To be more accurate, the core blocks 443 are tentatively assembled between the assembly guides 444 by allowing the hooks 445b of the core blocks 443 to be stopped by the safety bars 445a of the bobbin set 442. Of course, the coil 441 is seated inside the bobbin set 442, while the core blocks 443 are seated outside the bobbin set 442, so they are naturally insulated from each other once assembled.

As such, when the outer stator 440 with the core blocks 443 being tentatively assembled at the bobbin set 442 is axially inserted between the frame 520 and the motor cover 540, the frame 520 and the motor cover 540 are bolted together in the axial direction. Using the bolt clamping force, the frame 520 and the motor cover 540 support the outer stator 440 in the axial direction, and exert compression force at the same time to wedge the fixing wedges 446b of the core blocks 443 into the fixing grooves 446a and to make both sides of the core blocks 443 in the circumference direction closely adhered to the assembly guides 444 of the bobbin set 442. In this way, the core blocks 443 are firmly secured to the bobbin set 442.

While the foregoing embodiments and accompanying drawings of the present invention have explained in detail about an outer stator for a linear compressor where core blocks are arranged at the outer contour face of the bobbin set wrapped with the coil, the present invention may also comprise an inner stator for a linear compressor where core blocks are arranged at the inner contour face of the bobbin set wrapped with the coil. The present invention has been described in detail with reference to the embodiments and the attached drawings. However, the scope of the present invention is not limited to the embodiments and the drawings, but defined by the appended claims.

The invention claimed is:

1. A linear compressor that makes a reciprocating motion, comprising a movable member including a piston, a cylinder, a fixed member including a motor provided to the cylinder to make the piston reciprocate, one or more springs, a part of which is fixed to the movable member and another part of which is fixed to the fixed member so as to provide the movable member with a drive power to move from a first point to a second point, and a shell configured to house the movable member, the fixed member, and the one or more springs, wherein the motor comprises:
    an inner stator comprising a plurality of core blocks insulatively laminated in a circumferential direction;
    an outer stator that surrounds the inner stator with a predetermined spacing therebetween and including a coil winding, in which a coil is wound in a circumferential direction and current flows, first and second injection-molded bodies which are wound with the coil winding in an axial direction, that insulate the coil winding, and a plurality of core blocks coupled to the first and second injection-molded bodies; and
    one or more permanent magnets that maintain an air-gap between the inner stator and the outer stator and linearly reciprocate by an interactive electromagnetic force, wherein the first and second injection-molded bodies each includes a plurality of positioning devices formed in the circumferential direction at predetermined intervals to have the plurality of core blocks settled thereon, and wherein each of the plurality of positioning devices comprises an assembly guide that protrudes over at least one of both axial ends or outer contour faces of the first and second injection-molded bodies and that comes in contact with both ends of the plurality of core blocks in the circumferential direction.

2. The linear compressor of claim 1, wherein the plurality of core blocks is arranged with a predetermined spacing in the axial direction of the first and second injection-molded bodies and assembled to the first and second injection-molded bodies from the axial direction.

3. The linear compressor of claim 1, further comprising:
    a plurality of dislocation preventing devices provided between the first and second injection-molded bodies and the plurality of core blocks, respectively, so as to prevent the plurality of core blocks from being dislocated from the first and second injection-molded bodies in the axial direction.

4. The linear compressor of claim 3, wherein each of the plurality of dislocation preventing devices includes a safety bar provided on an inside on an axial end of one of the first and second injection-molded bodies, and a hook formed at an inner face of one end of each of one of the plurality of core blocks.

5. The linear compressor of claim 1, further comprising:
    a plurality of fixation devices provided between the first and second injection-molded bodies and the plurality of core blocks, so as to fix the plurality of core blocks to the first and second injection-molded bodies.

6. The linear compressor of claim 5, wherein each of the plurality of fixation devices includes a fixing groove elongatedly formed an axial end of one of the first and second injection-molded bodies in the circumferential direction, and a fixing wedge formed on the inner face of one of the plurality of core blocks and configured to slide into the fixing groove.

7. The linear compressor of claim 4, wherein the safety bar is formed as one of at least one or more grooves or at least one or more steps, and wherein the safety bar engages with the hook.

8. The linear compressor of claim 6, wherein the fixing groove is elongatedly formed between adjacent assembly guides of adjacent positioning devices.

9. The linear compressor of claim 6, wherein the fixing wedge is larger than the fixing groove so as to wedge into the fixing groove.

10. A linear compressor comprising a movable member including a piston, a cylinder, a fixed member including a motor that drives the piston to reciprocate within the cylinder, one or more springs, one end of each of which is fixed to the movable member and another end of each of which is fixed to the fixed member, and a shell configured to house the movable member, the fixed member, and the one or more springs, wherein the motor comprises:
    an inner stator comprising a plurality of core blocks;
    an outer stator that surrounds the inner stator with a predetermined spacing therebetween and including a coil winding, a plurality of first and second injection-molded bodies which are each wound with the coil winding and insulate the coil winding, and a plurality of core blocks coupled to the first and second injection-molded bodies; and a plurality of permanent magnets that maintains an air-gap between the inner stator and the outer stator and linearly reciprocates by an interactive electromagnetic force, wherein the plurality of first and second injection-molded bodies each includes a plurality of positioning devices formed in a circumferential direction at predetermined intervals configured to receive the plurality of core blocks positioned thereon, and wherein each of the plurality of positioning devices comprises an assembly guide that protrudes beyond at least one of axial ends or outer faces of the first and second injection-molded bodies and that comes in contact with ends of the plurality of core blocks in the circumferential direction.

11. The linear compressor of claim 10, wherein the plurality of core blocks is arranged with a predetermined spacing in the axial direction of the first and second injection-molded bodies and assembled to the first and second injection-molded bodies from the axial direction.

12. The linear compressor of claim 10, further comprising:
a plurality of dislocation preventing devices provided between the first and second injection-molded bodies and the plurality of core blocks, respectively, that prevents the plurality of core blocks from being dislocated from the first and second injection-molded bodies in the axial direction.

13. The linear compressor of claim 12, wherein each of the plurality of dislocation preventing devices includes a safety bar provided on an inside end of one of the first and second injection-molded bodies, and a hook formed at an inner face of one of the plurality of core blocks.

14. The linear compressor of claim 13, wherein the safety bar is fondled as one of at least one or more grooves or at least one or more steps, and wherein the safety bar engages with the hook.

15. The linear compressor of claim 10, further comprising:
a plurality of fixation devices provided between the first and second injection-molded bodies and the plurality of core blocks, that fixes the plurality of core blocks to the first and second injection-molded bodies.

16. The linear compressor of claim 15, wherein each of the plurality of fixation devices includes a fixing groove formed on one of the first and second injection-molded bodies, and a fixing wedge formed on the inner face of one of the plurality of core blocks and configured to slide into the fixing groove.

17. The linear compressor of claim 16, wherein the fixing groove extends between adjacent assembly guides of adjacent positioning devices.

18. The linear compressor of claim 16, wherein the fixing wedge is larger than the fixing groove so as to wedge into the fixing groove.

* * * * *